UNITED STATES PATENT OFFICE.

GUSTAV WILHELM ALBRECHT STEIN, OF WETZLAR, GERMANY.

METHOD OF MANUFACTURING HYDRAULIC CEMENT.

SPECIFICATION forming part of Letters Patent No. 530,247, dated December 4, 1894.

Application filed March 23, 1894. Serial No. 504,762. (No specimens.)

*To all whom it may concern:*

Be it known that I, GUSTAV WILHELM ALBRECHT STEIN, a subject of the Emperor of Germany, residing at Wetzlar, in the Empire of Germany, have invented a certain new and useful Improvement in the Manufacture of Hydraulic Cement, of which the following is a specification.

Hitherto to the manufacture of hydraulic cement, it has been customary to transform the raw materials, designated as the raw-mixture, into bricks before subjecting them to a burning action, in order that thereafter the same might be brought to a condition for use. Such raw bricks generally after being so formed, as practice has demonstrated, are affected by atmospheric conditions, as well as by mechanical influences. In a word, they have to be placed in protected rooms, where they are permitted to remain for some time before being subjected to artificial drying and anterior to being taken to the kiln to be treated therein.

My invention relates to an improvement in the manufacture of the so-called raw bricks; and to which end my invention consists in mixing with the raw materials of cement, slag sand and hydrate of lime in quantities of five to ten per cent. of the same, so as to prevent thereby after being caused to assume the required form, disintegration before the burning thereof in a kiln or the like and in order also to produce a very hard combined mass in its assumed form that will not be affected by atmospheric changes or conditions.

In order that others skilled in the art to which my invention appertains may understand the same, I will now proceed to describe a mode of carrying my invention into effect.

To a charge composed of raw materials is added five to ten per cent. of hydrate of lime and five to ten per cent. of slag sand and the combined mass is then brought to the condition or form required.

In consequence of the above treatment of the composition, the same after being formed into raw bricks, will effectually resist atmospheric conditions to such an extent as to render it possible to subject such bricks to the influence of the atmosphere even at the freezing point, without crumbling or anywise affecting the same. In a word, bricks made according to my invention, are exceedingly hard and even after time exposure to the influence of the atmosphere they can be taken to the kiln for treatment therein and subsequent use. Such bricks after removal from the kiln will be found to possess superior wearing properties, due to the fact that they are exceedingly hard. This is accounted for by the addition of the slag sand and hydrate of lime to the mass in about the proportions hereinbefore stated.

Having thus described the nature and objects of my invention, what I claim as new, and desire to secure by Letters Patent, is—

In the manufacture of hydraulic cement, mixing with a raw mixture of cement, slag sand and hydrate of lime in about the proportions stated to prevent disintegration of the same before the burning thereof and so as to produce when the mass has been caused to assume the required form an article which will not be affected by atmospheric changes or conditions, substantially as described.

In witness whereof I have hereunto signed my name in the presence of two subscribing witnesses.

GUSTAV WILHELM ALBRECHT STEIN.

Witnesses:
ALVESTO S. HOGUE,
JEAN GRUND.